United States Patent [19]

Battles

[11] Patent Number: 4,582,479

[45] Date of Patent: Apr. 15, 1986

[54] FUEL COOLED OXY-FUEL BURNER

[75] Inventor: Donald D. Battles, Atlanta, Ga.

[73] Assignee: The Cadre Corporation, Atlanta, Ga.

[21] Appl. No.: 688,063

[22] Filed: Dec. 31, 1984

[51] Int. Cl.⁴ ............................................. F23D 11/36
[52] U.S. Cl. .................................. 431/160; 431/175;
431/187; 431/353
[58] Field of Search ............... 431/160, 174, 175, 187,
431/353, 351

[56] References Cited

U.S. PATENT DOCUMENTS

| | | | |
|---|---|---|---|
| 3,115,405 | 12/1963 | Boyd | 75/52 |
| 3,197,539 | 7/1965 | Hinds | 13/9 |
| 3,387,784 | 6/1968 | Ward, Jr. | 239/132.3 |
| 3,427,151 | 2/1969 | Koudelka et al. | 75/59 |
| 4,473,350 | 9/1984 | Gitman | 431/160 |

FOREIGN PATENT DOCUMENTS

| | | |
|---|---|---|
| 0030360 | 6/1981 | European Pat. Off. |
| 0038257 | 10/1981 | European Pat. Off. |
| 2932938 | 2/1981 | Fed. Rep. of Germany |
| 1003515 | 9/1965 | United Kingdom |
| 2049156 | 12/1980 | United Kingdom |
| 2082624 | 3/1982 | United Kingdom |
| 2101637 | 1/1983 | United Kingdom |
| 2136547 | 9/1984 | United Kingdom |

OTHER PUBLICATIONS

Developments in the Use of Oxy/Gas Burners; Journal of the Institute of Fuel–Mar. 1967.
High Efficiency Operation for Electric Arc Furnace; Steelmaking; Toshin Steel Co., Ltd., Sep. 1975.

*Primary Examiner*—Carroll B. Dority, Jr.
*Attorney, Agent, or Firm*—Thomas & Kennedy

[57] ABSTRACT

A high velocity oxygen fuel burner (10) includes a combustor assembly (11) mounted in a graphite block (12), with the burner mounted in a water jacket (18) of a furnace. The combustor assembly includes a combustion chamber (48) that receives a stream of oxygen along its center axis (51). The fuel moves from fuel barrel (32) through fuel passages (50), with a portion of the fuel being diverted into the combustion chamber (48) by the annular fuel diverter ring (52) and with the rest of the fuel moving on through the fuel extension passages (50b) and through nozzle ring (34). The nozzle ring directs the fuel into the flame as it emerges from the combustion chamber, so that the fuel from the nozzle has a cooling effect at the exposed end of the burner and tends to develop the flame in an annular ring about the stream of high velocity oxygen that is directed toward the work product in the furnace.

9 Claims, 6 Drawing Figures

FUEL COOLED OXY-FUEL BURNER

BACKGROUND OF THE INVENTION

This invention relates to oxygen fuel burners of the type that can be used with industrial furnaces for high temperature heating of work products, where the fuel and oxygen are mixed together to form a high velocity flame that is directed toward the work product in the furnace. More particularly, the invention relates to an oxygen fuel burner that utilizes the fuel both for cooling the combustion chamber and for forming a flame in the combustion chamber. A stream of high velocity oxygen moves along the longitudinal axis of the combustion chamber and the fuel is added to the periphery of the oxygen stream to form a cylindrical flame in the combustion chamber. Additional fuel is added in a circular pattern about the flame outside the combustion chamber. If more oxygen is used than is necessary to support complete combustion of the fuel, the fuel heats the excess oxygen as the flame moves toward the work product and the excess oxygen functions to oxygen-lance the work product.

High velocity burners are utilized in industrial furnaces, either alone or in combination with electrodes in electric arc furnaces for rapidly and efficiently melting a work product such as steel. It is desirable to direct the flame from a burner toward the work product so that the heat from the flame is transferred directly to the work product. In addition, it is desirable to direct a stream of oxygen toward a work product in a furnace so as to oxygen-lance the work product.

In the past, oxygen lancing has been accomplished by opening the door of the furnace, projecting a metal tube into the furnace and then moving a stream of oxygen through the tube to move the oxygen into intimate contact with the hot work product. The tube was manipulated so as to direct the stream of oxygen emerging from the tube toward the work product. Of course, a substantial amount of heat is lost when the door of the furnace remains open during the oxygen lancing procedure, the end of the tube projected into the furnace tends to deteriorate, and a substantial amount of the oxygen is lost in the atmosphere of the furnace because the oxygen is not very hot when it emerges from the oxygen lancing tube and engages the work product.

Recently, as described in U.S. Pat. No. 4,473,350, heating a work product in an industrial furnace with a high velocity flame has been accomplished by moving a stream of oxygen through a burner and adding fuel in a circular arrangement about the stream of oxygen so that the fuel tends to film-cool the surface of the combustion chamber. Later is was determined that oxygen lancing of the work product could be accomplished with the burner of the type disclosed in U.S. Pat. No. 4,473,350 by supplying excess oxygen through the combustion chamber of the burner. The flame carries the excess oxygen on out into the furnace, the flame heats the oxygen, and when the unburned oxygen engages the work product the oxygen will have been preheated by the flame and readily reacts with the metal product. These new oxygen fuel burners avoid the requirement of opening a furnace door and inserting the conventional lancing tube through the door. However, the radiation of heat from the work product and the flame within the furnace, and the convection heat transmitted from the flame and elements within the furnace to the face of the burner tend to rapidly deteriorate the burner.

Moreover, the prior art high velocity oxygen fuel burners have included, in some cases, a graphite burner block that resists rapid deterioration from exposure to heat. While the graphite burner block resists deterioration from heat, it has been found that the porous nature of graphite permits some of the fuel to seep through the burner block to the outside of the furnace, causing minor fires in the vicinity of the burner block. The exterior flame is hazardous to the workers about the furnace, tends to deteriorate the conduits, fittings and other elements in the vicinity of the burners, and wastes energy.

SUMMARY OF THE INVENTION

Briefly described, the present invention comprises an oxygen fuel burner that includes a tubular shaped combustor body that is mounted in a graphite insulator sleeve and supported in a conventional burner water jacket of an industrial furnace. The combustor body in includes a cylindrical wall that defines a combustion chamber that has a flame delivery opening, and a plurality of fuel passages are formed in the cylindrical wall and are spaced about the combustion chamber. An oxygen conduit communicates with the supply end of the combustor and directs a stream of oxygen along the axis of the combustion chamber. An internal groove extends outwardly from the combustion chamber and intersects the fuel supply passages so as to divert some of the fuel moving along the fuel supply passages into the combustion chamber, so that the fuel moving into the combustion chamber tends to surround the stream of oxygen and form a circular flame within the combustion chamber that projects on into the furnace. Also, a circular nozzle is mounted to the flame delivery end of the combustor and forms an annular chamber for receiving fuel from the fuel passages, and the nozzle openings direct the fuel into the furnace in a pattern about the flame, whereby the fuel from the circular nozzle has a cooling effect out in front of the burner and tends to supply additional fuel to the oxygen to increase the size and velocity of the flame.

The fuel moving through the combustion chamber tends to film cool the wall of the combustion chamber, the fuel moving through the fuel supply passages about the combustion chamber tends to conduct heat from the combustion chamber, and the fuel added to the flame beyond the combustion chamber tends to have a cooling effect on the surfaces of the burner exposed to the furnace chamber.

Thus, it is an object of this invention to provide a fuel cooled oxygen fuel burner for use with industrial furnaces, which is capable of developing a high velocity, oxygen-rich flame which is generated in a combustion chamber and projected beyond the combustion chamber, and which uses fuel to cool the combustion chamber.

Another object of this invention is to provide a combustor assembly for an oxygen fuel burner which is durable and inexpensive to manufacture, which operates at a relatively cool temperature to develop a flame and to project the flame at a high velocity into a furnace.

Another object of this invention is to provide a fuel cooled oxygen fuel burner which operates at a relatively low temperature and which is capable of directing a stream of oxygen through the center of a flame, so that the oxygen not comsumed by the flame is preheated as it is projected into the furnace toward a work product and is used for oxygen-lancing the work product in the furnace.

Other objects, features and advantages of this invention will be come apparent upon reading the following specification, when taken in conjunction with the accompanying drawings.

DETAILED DESCRIPTION

Figure 1:
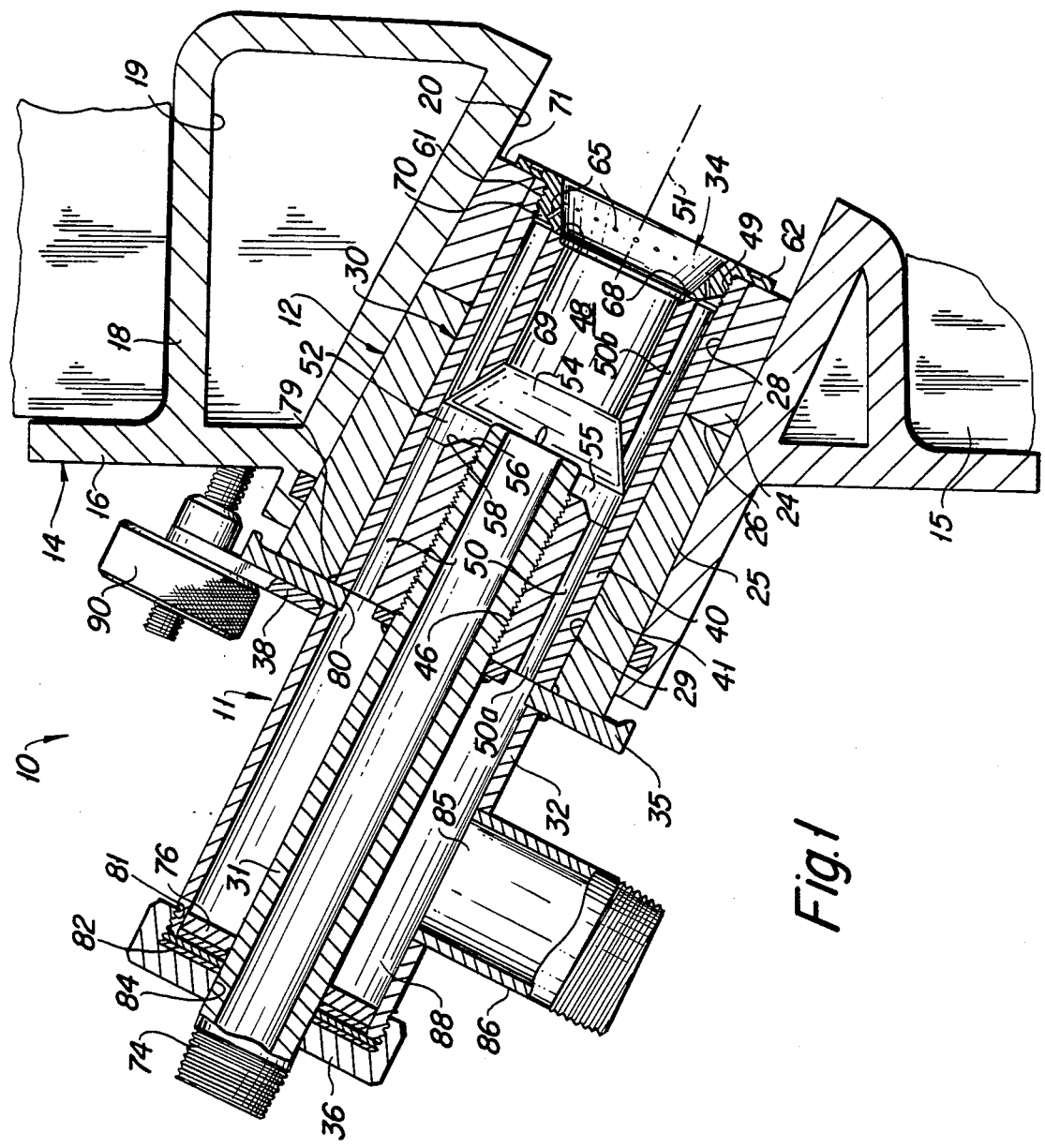
FIG. 1 is a cross-sectional illustration of the fuel cooled oxygen fuel burner, taken along the longitudinal axis of the burner.

Referring now in more detail to the drawings, in which like numerals indicate like parts throughout the several views, FIG. 1 illustrates the fuel cooled oxygen fuel burner 10 which includes a combustor assembly 11 mounted in a graphite insulator block 12, with the insulator block being mounted in a conventional water jacket burner mount 14 that is mounted in an opening of the wall 15 of an industrial furnace. The water jacket burner mount 14 includes a mounting plate 16 that is attached to the furnace wall, and an approximately annular shaped protrusion 18 that extends into the opening in the wall of the furnace. The protrusion 18 includes an internal water circulation chamber 19 through which cooling water circulates. The protrusion also defines burner opening 20 which is circular in cross-section but which is also tapered slightly from the outside toward the inside, with the smaller diameter of the burner opening facing the inside of the furnace.

The graphite insulator block 12 is formed in two approximately cylindrical segments 24 and 25, with their exterior surfaces being sized and shaped to correspond to the size and shape of the internal surfaces of burner opening 20. The facing surfaces 26 of the segments 24 and 25 of the graphite insulator block normally abut each other. The internal annular surfaces 28 and 29 of the segments 24 and 25 are cylindrical and are of the same diameter, and are coaxial.

As illustrated in FIG. 1, the combustor assembly 11 includes combustor 30, oxygen conduit 31, fuel barrel 32, nozzle ring 34, mounting plate 35, cap 36, and locking plate 38.

Figure 2:
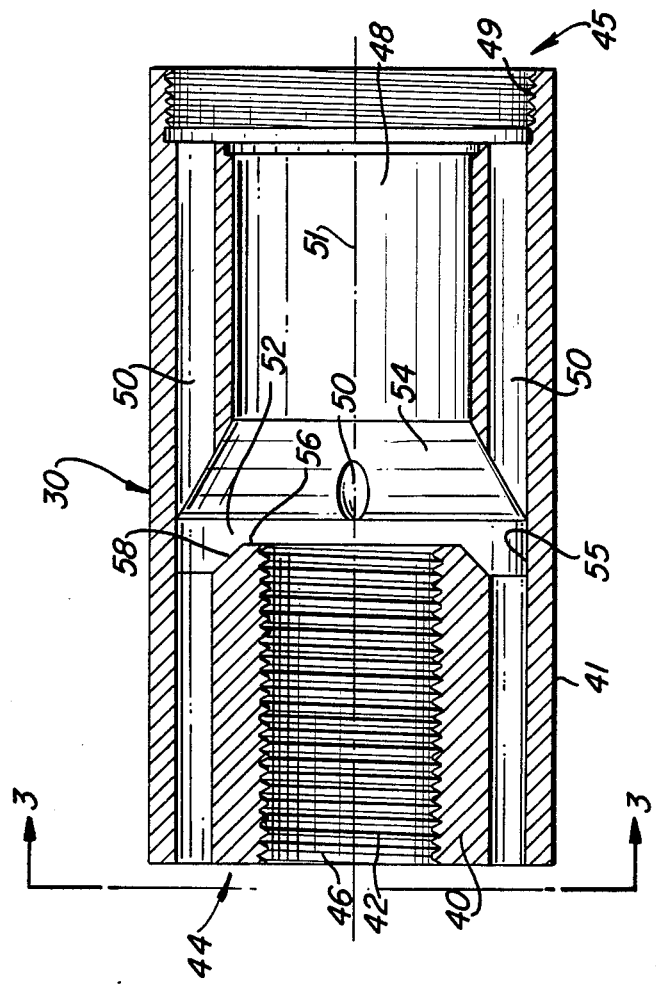
FIG. 2 is a cross-sectional view of the combustor, taken along the longitudinal axis thereof.
Figure 3:
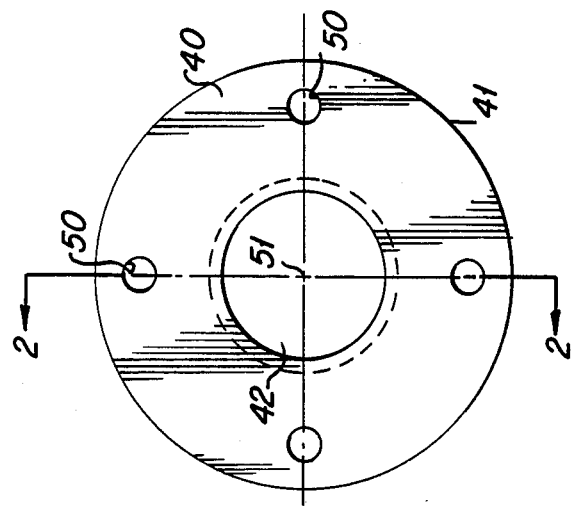
FIG. 3 is an end view of the combustor, taken along lines 3—3 of FIG. 2.

As illustrated in FIGS. 1, 2 and 3, combustor 30 is tubular shaped and is of one piece construction, with an annular wall 40 that defines a cylindrical exterior surface 41 and an axial passageway 42. The combustor 30 has a supply end 44 and a flame delivery end 45. The axial passageway 42 extends entirely through the combustor from the supply end 44 to the flame delivery end 45, and the portion of the passageway adjacent supply end 44 is formed with a spiral thread 46 to receive the threads at the delivery end of the oxygen conduit 31, so as to function as an oxygen supply passage. The portion 48 of the axial passageway 42 adjacent the flame delivery end 45 of the combustor functions as a combustion chamber. The combustion chamber 48 has a cylindrical surface that is coaxial with the oxygen supply passage 46. The flame delivery end 45 of the combustor 30 is counter bored and internally threaded at 49 so as to form a seat for the nozzle ring 34.

A plurality of fuel supply passages 50 are formed longitudinally through the annular wall 40 of the combustor 30, from the supply end 44 to the flame delivery end 45. As illustrated in FIG. 3, the fuel supply passages are arranged in a circumferential array about the combustion chamber 48, with the fuel supply passages 50 being oriented at 90° intervals about the longitudinal axis 51 of the axial passageway 42.

As illustrated in FIGS. 1 and 2, an internal groove 52 extends radially outwardly from the axial passageway 42, between the oxygen supply passage 46 and the combustion chamber 48. The internal groove 52 intersects the fuel supply passages 50, with the groove 52 being tapered at approximately a 30° angle to form a sloped annular surface 54 that tapers inwardly from the fuel supply passages 50 to the combustion chamber 48. Also, the internal groove 52 has a cylindrical channel 55 with a diameter large enough to circumscribe all of the fuel supply passges 50. The facing surface 56 of the combustor 30 at the internal end of the oxygen supply passage 46 is beveled at 58. The bevel 58 is formed at 45°, is an annular surface, and together with the sloped annular surface 54 of the internal groove 52 causes the internal groove 52 to function as a fuel diverter, as will be explained in more detail hereinafter.

Figure 6:
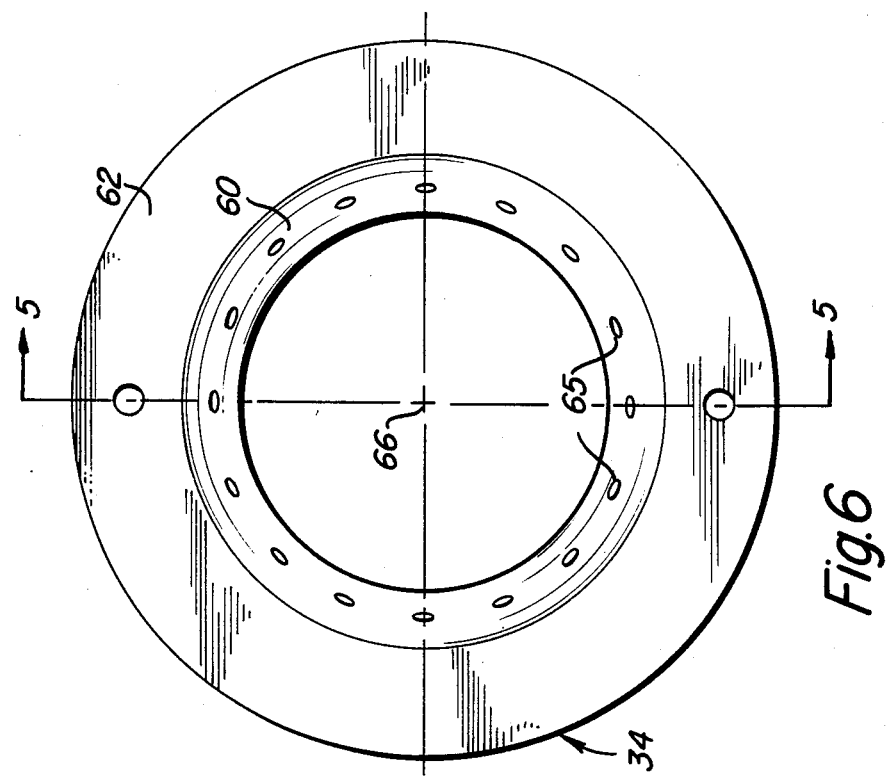
FIG. 6 is a front view of the nozzle ring.
Figure 5:
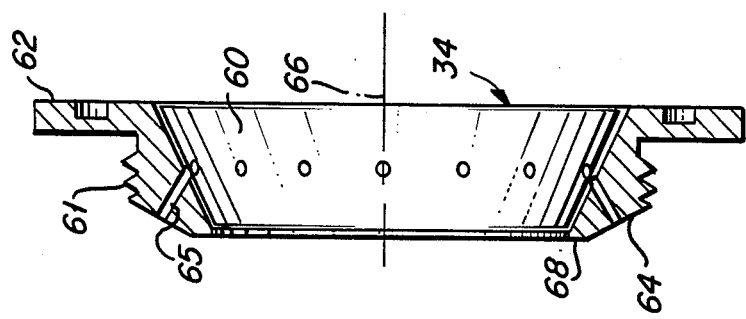
FIG. 5 is a cross-sectional view of the nozzle ring.

As illustrated in FIGS. 5 and 6, nozzle ring 34 has a tapered annular inner surface 60, a threaded annular outer surface 61, a radially protruding flange 62 adjacent the larger diameter end of the inner surface 60, and an annular beveled end 64 adjacent the smaller diameter end of the inner surface 60. A plurality of nozzle openings 65 extend through the nozzle ring 34, from the annular beveled end 64 to the tapered annular inner surface 60. The nozzle openings are arranged in an equally spaced annular array about the longitudinal axis 66, with each nozzle opening 65 directed inwardly toward the longitudinal axis 66 of the nozzle ring.

As illustrated in FIG. 1, the external threads 61 of nozzle ring 34 are sized and shaped so as to engage with the threads of the nozzle ring seat 49 of combustor 30. When the nozzle ring 34 has been screwed into position in the combustor 30, the inner end 68 of the nozzle ring becomes frictionally engaged with the recessed surface 69 of the counter bored nozzle ring seat 49, and the annular beveled end 64 of the nozzle ring forms an annular fuel supply chamber 70 with the nozzle ring seat 49. Also, the radially extending flange 62 of the nozzle ring 34 extends beyond the combustor 30 so as to overlap the exposed end surface 71 of segment 24 of graphite insulator block 12.

With this construction, the annular fuel supply chamber 70 communicates with all of the fuel supply passages 50, and the fuel received from the passages 50 can circulate in an annular path within the fuel supply chamber 70 to reach all of the nozzle openings 65. When the fuel moves through the nozzle openings 65, the fuel will be directed inwardly toward the longitudinal axis 51 of the combustor 30. In the meantime, the flange 62 shields the exposed end surface 71 of the segment 24 of the graphite insulator block 12 from heat radiation and heat convection from the flame and work product within the furnace.

Figure 4:
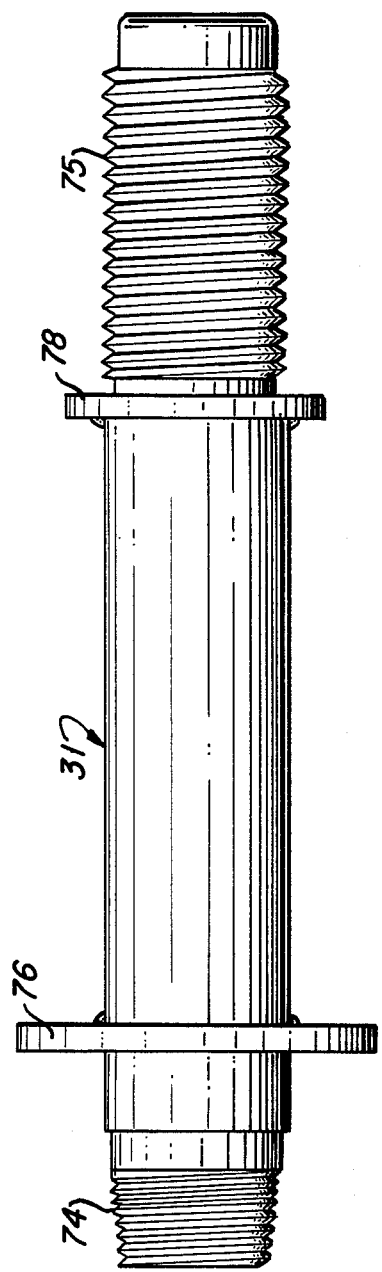
FIG. 4 is a side view of the oxygen supply barrel.

As illustrated in FIGS. 1 and 4, oxygen conduit 31 is externally threaded at both ends 74 and 75, with positioning flange 76 mounted to the exterior surface of conduit 31 adjacent thread 74, and with smaller diameter positioning flange 78 mounted to the exterior surface adjacent thread 75. Mounting plate 35 (FIG. 1) is rigidly attached to combustor 30 by means of a weldment 79 or the like, and mounting plate 35 defines a circular opening 80 which is of a diameter large enough so as to leave the fuel supply passages 50 open at the supply end 44 of the combustor. Fuel barrel 32 is cylindrical and is rigidly mounted at one of its ends to mounting plate 35, and is coaxial with the combustor 30. The other end of the fuel barrel 32 is externally threaded at 81, and the internally facing threads 82 of cap 36 engage threads 81. Cap 36 also defines a central opening 84 that fits about oxygen conduit 31. Fuel barrel 32 defines a side opening 85, and supply pipe 86 is connected to the fuel barrel about opening 85 and functions to supply fuel to the fuel barrel.

With this arrangement, fuel, such as natural gas, flows through supply pipe 86 to fuel barrel 32, and the fuel flows from the annular chamber 88 inside the fuel barrel about oxygen conduit 31 through the fuel supply passages 50. The internal groove or fuel diverter 52 divides each of the fuel supply passages into primary fuel passages 50a and fuel extension passages 50b. All of the fuel moves from fuel barrel 32 through the primary fuel passages 50a, and when the fuel reaches the fuel diverter 52, a portion of the fuel is diverted from the fuel passages into the combustion chamber 48, and a portion of the fuel continues to move on through the fuel extension passages 50b to the annular fuel supply chamber 70 behind the nozzle ring 34.

In the meantime, a stream of oxygen is directed through oxygen conduit 31, through the oxygen supply passage 46 of combustor 30, and through combustion chamber 48, on beyond the combustor assembly into the furnace chamber. As the oxygen stream moves from the oxygen conduit 31 into the combustion chamber 48, the fuel being diverted from fuel supply passages 50 by the fuel diverter 52 tends to form a ring of fuel about the stream of oxygen. The cylindrical mixture of fuel and oxygen ignites within the combustion chamber 48, and the flame developed within the combustion chamber is directed at high velocity on beyond the combustor assembly into the furnace. The ring of fuel tends to film cool the surface of the combustion chamber.

The fuel that continues to move on through fuel extension passages 50b eventually moves through the nozzle openings 65 of nozzle ring 34 and forms an annular cloud of fuel about the flame, with the fuel being directed inwardly toward the axis 51 of the combustion chamber, and therefore inwardly toward the stream of oxygen. This tends to enhance the development of the flame as it moves on into the furnace, and tends to maintain the flame in an approximately tubular shape as it surrounds the oxygen in the stream of oxygen.

The oxy-fuel burner 10 can be operated in a stoichiometric mode in which the amount of fuel and the amount of oxygen are matched so that there is complete combustion of both the oxygen and the fuel. This is a typical condition when the oxy-fuel burner is being used to melt scrap and other metals within the furnace.

However, when it is decided to oxygen lance the work product within the furnace, the ratio of oxygen to fuel is increased so that more oxygen is supplied than is required to burn the fuel. Inasmuch as the oxygen is supplied in a high velocity stream through the combustion chamber, the oxygen that is not consumed in the flame is projected toward the work product. As the oxygen moves through the combustion chamber and through the flame within the furnace, the oxygen is preheated so that it is hot when it reaches the work product. The heating of the oxygen causes the oxygen to react readily with the work product, so that a large percentage of the oxygen is involved with the reaction, and the amount of oxygen lost to the atmosphere of the furnace is minimized.

The fuel moving through the fuel supply passages 50 tends to maintain the combustor 30 in a relatively low temperature condition. More particularly, the fuel moving through the fuel extension passages 50b that surround the combustion chamber 48 cools the flame delivery end of the combustor 30, and the fuel that is diverted by the fuel diverter 52 into the combustion chamber 48 forms a film adjacent the surface of the combustion chamber, and tends to film cool the combustion chamber surface. Moreover, the fuel that is moved on through the fuel extension passages 50b and then through the nozzle ring 34 supplements the flame on beyond the combustor 30 and has a cooling effect at the exposed end of the combustor assembly. This tends to reduce the effect on the exposed portion of the burner of radiation and convection of heat from the flame and from the work product within the furnace.

After the oxy-fuel burner has been utilized for a prolonged period and it is time for maintenance of the burner, the burner is dismounted from the water jacket burner mount 14 by the loosening of the mounting bolts 90 and removal of the locking plate 38 from behind the mounting plate 35, whereupon the burner can be axially withdrawn from the tapered burner opening 20. If the exposed end surface 71 of the graphite insulator block 12 has deteriorated to the extent that it needs to be replaced, the nozzle ring 34 can be unscrewed from the combustor 30 and the segment 24 of the graphite insulator block 12 can be slipped off the end of the combustor and a new one substituted therefor. Also, should the nozzle ring 34 need to be replaced, a substitute nozzle ring can be mounted to the combustor. Therefore, these elements of the combustor assembly 11 which are more subject to deterioration than the other elements can be easily replaced.

The amount of fuel that is to be diverted from the fuel supply passages 50 into the combustion chamber 48 can be regulated by projecting the oxygen conduit 31 further toward the combustion chamber 48. This can be accomplished by adjusting the location of the positioning flange 78 of the oxygen conduit 31, and by screwing the oxygen conduit further into or out of the oxygen supply passage 46 of the combustor 30.

Although the invention has been described in the form of a preferred embodiment, many modifications, additions, and deletions, may be made thereto without departure from the spirit and scope of the invention, as set forth in the following claims.

I claim:

1. A combustor assembly for an oxygen fuel burner comprising a cylindrically shaped combustor body having a supply end and a flame delivery end and including an annular wall structure with an approximately cylindrical outside surface and a main passage extending therethrough with its longitudinal axis coaxial with said combustor body, a plurality of fuel delivery passages formed in said annular wall extending approximately parallel to the axis of said main passage and arranged in a circumferential array about said main passage, an internal annular recess formed in said annular wall structure intermediate the ends of said main passage and extending radially outwardly from said main passage and intersecting at least some of said plurality of fuel delivery passages, and an annular nozzle ring at the delivery end of said combustor body surrounding said main passage and covering said fuel passages and defining a plurality of nozzle openings for the fuel, whereby oxygen is supplied to one end of said main passage at the supply end of said combustor body and flows through and out the other end of said main passage at the flame delivery end of said combustor body, and fuel is supplied to one end of each of said combustor body fuel delivery passages and flows through the fuel passages to the annular recess where a portion of the fuel moves into and through the main passage and mixes with the oxygen to form a flame in the main passage and a portion of the fuel continues to move on through the fuel passages and through the nozzle ring at the flame delivery end of the combustor body and supplements the flame beyond the main passage.

2. The combustor assembly of claim 1 and wherein the plurality of nozzle openings are constructed and arranged to direct fuel from said fuel passages into the outer portion of the flame emerging from the main passage.

3. The combustor assembly of claim 1 and wherein said internal annular recess is beveled in the direction of flow of the fuel so as to direct some of the fuel to converge from the fuel delivery passages toward the main passage.

4. The combustor assembly of claim 1 and wherein said internal annular recess divides said main passage into an oxygen conduit support opening adjacent the supply end of said combustor body and a combustion chamber adjacent the flame delivery end of said combustor body and further including an oxygen suppy conduit extending into and moveable along the length of said oxygen supply support opening.

5. The combustor asembly of claim 1 and further including an insulator sleeve surrounding said combustor body, said nozzle ring being connected to said combustor body and extending radially beyond said combustor body and covering at least a portion of said insulator sleeve.

6. The combustor assembly of claim 5 and wherein said insulator sleeve is fabricated from graphite.

7. The combustor assembly of claim 5 and wherein said insulator sleeve is formed in at least two axial sections, with one section surrounding the supply end of said combustor body and with the other section surrounding the flame delivery end of said combustor body, said nozzle ring being removeably connected to said combustor body, whereby the nozzle ring can be removed from the combustor body and the section of said insulator sleeve surrounding the flame delivery end of said combustor body removed and replaced with another section of insulator sleeve.

8. The combustor assembly of claim 7 and further including a water jacket surrounding said insulator sleeve.

9. A combustor assembly for an oxygen-fuel burner comprising a tubular combustor body having a supply end and a flame delivery end and including an annular wall defining an approximately cylindrical combustion chamber with a longitudinal axis coaxial with the longitudinal axis of said combustor body, a plurality of fuel delivery passages formed in said annular wall and extending in an annular array about said combustion chamber and extending from the supply end to the delivery end of said combustor body, a nozzle ring mounted to the delivery end of said combustor body and forming with said combustor body an annular chamber in communiction with said fuel delivery passages, a plurality of nozzle passages extending through said nozzle ring for directing fuel from said fuel delivery passages beyond said combustor body, said combustor body including fuel passage means for passing some fuel from said fuel delivery passages inwardly toward said combustion chamber, and oxygen supply means arranged to direct a stream of oxygen along the longitudinal axis of said combustion chamber and to mix with the fuel from said fuel passage means and form a flame in said combustion chamber.

\* \* \* \* \*